United States Patent
Miyajima et al.

[11] Patent Number: 6,100,369
[45] Date of Patent: Aug. 8, 2000

[54] PROCESS FOR CONTINUOUSLY PRODUCING POLYESTERS

[75] Inventors: Kazumoto Miyajima; Hideshi Kurihara, both of Matsuyama, Japan

[73] Assignee: Teijin Limited, Japan

[21] Appl. No.: 09/147,426

[22] PCT Filed: Apr. 30, 1998

[86] PCT No.: PCT/JP98/01977

§ 371 Date: Dec. 21, 1998

§ 102(e) Date: Dec. 21, 1998

[87] PCT Pub. No.: WO98/50448

PCT Pub. Date: Nov. 12, 1998

[30] Foreign Application Priority Data

May 6, 1997 [JP] Japan ..................... 9-115570

[51] Int. Cl.[7] .............. C08G 63/02; C08F 2/00
[52] U.S. Cl. ............ 528/272; 528/296; 528/298; 528/300; 528/302; 528/307; 528/308; 528/308.6; 526/62; 526/65; 526/66; 526/67; 526/68; 526/70
[58] Field of Search ................. 528/272, 296, 528/298, 300, 302, 307, 308, 308.6; 526/62, 65, 66, 67, 68, 70

[56] References Cited

FOREIGN PATENT DOCUMENTS

| | | |
|---|---|---|
| 49-25196 | 6/1974 | Japan . |
| 49-126793 | 12/1974 | Japan . |
| 50-110489 | 8/1975 | Japan . |
| 56-15653 | 4/1981 | Japan . |
| 60-163918 | 8/1985 | Japan . |
| 5-53814 | 8/1993 | Japan . |
| 5-230199 | 9/1993 | Japan . |

OTHER PUBLICATIONS

JP 63–1355421, A (Nippon Ester K.K.), Jun. 7, 1998 (Abstract).

JP 49–52891, A (Toray Industries, Inc.) May 22, 1974 (Abstract).

JP 50–2760, A (Toray Industries, Inc.), Jan. 13, 1975 (Abstract).

Primary Examiner—Samuel A. Acquah
Attorney, Agent, or Firm—Rader, Fishman & Grauer

[57] ABSTRACT

A method for continuously producing a polyester by continuously melt-polymerizing a raw material consisting of a dicarboxylic acid component composed of mainly an aromatic dicarboxylic acid and containing an alicyclic dicarboxylic acid or an aliphatic dicarboxylic acid, or their ester-forming derivatives with a diol component, characterized in that said diol component as a distillate in the polycondensation reaction, including an adhering material, is condensed, said adhering material is separated centrifugally, and then the residual diol component, after distillation, is supplied to an esterification reaction or an ester interchange reaction.

5 Claims, 1 Drawing Sheet

PROCESS FOR CONTINUOUSLY PRODUCING POLYESTERS

TECHNICAL FIELD

The present invention relates to a method for a continuous production of a polyester by melt-polymerizing a raw material consisting of a dicarboxylic acid component composed of mainly an aromatic dicarboxylic acid and containing an alicyclic dicarboxylic acid or an aliphatic dicarboxylic acid, or their ester-forming derivatives with a diol component.

BACKGROUND ARTS

"Polyesters" represented by a polyethylene terephthalate, a polybutylene terephthalate or a polyethylene naphthalate, are widely used for various uses, since they have excellent physical and chemical properties. And as for the uses, the polyesters are widely used not only as fibers for clothings and industrial fibers such as a tire cord by utilizing their excellent mechanical characteristics such as a strength and a modulus of elasticity, heat resistant characteristics, etc., but also as a film processed as a plane and a molded engineering-plastic product processed three dimensionally.

In general, the polyesters used in such various uses, are produced by a direct polymerization method or an ester interchange method. Here, firstly, the former direct polymerization method is described. In this method, a polyester precursor is produced by performing a direct esterification reaction of a dicarboxylic acid component composed of mainly an aromatic dicarboxylic acid and containing an alicyclic dicarboxylic acid or an aliphatic dicarboxylic acid, or their ester-forming derivatives with a diol component. and then performing a polycondensation of the above polyester precursor under an atmospheric pressure or a reduced pressure. While, in the later ester interchange method, a lower alkyl ester of the acid component with the diol component are subject to the ester interchange reaction to form another polyester precursor, and then a polycondensation reaction of the precursor is performed under the atmospheric pressure or the reduced pressure.

As to the above polyester polymerizations, conventionally, a batch-wise method is largely used, but in order to produce the polyesters at a low cost and to take an advantage of a scale merit, a shift to a continuous process has been promoted, and merits for adopting the continuous process such as improvements in the yield and quality of the product, a uniform quality, an improvement in operational efficiency, a reduction in production cost, etc., are extremely high.

In general, most of the continuous production methods of the polyesters are conducted by using a process combining each plural esterification reactors or ester interchanging reactors with polycondensation reactors. For example, it is performed that a monomer or an oligomer is formed by charging raw materials into the ester interchange reactor or the esterification reactor, then the formed material is consecutively supplied into an initial polycondensation reactor for performing the reaction under a reduced pressure to produce a polymer having a low molecular weight, and further the polymer having a low molecular weight is supplied to a polycondensation reactor under a reduced pressure to obtain a polymer having a medium molecular weight and a polymer having a high molecular weight.

In this case, a diol component distilled out of the polycondensation reactor for the polyesters, is condensed in a tube type heat exchanger or a wet type condenser generally in view of an economical advantage, and then recovered and reused as a part of the raw materials. Further, there are a method of recovering the diol component without a distillation and a method of recovering after the distillation in the recovery/reuse methods.

Incidentally, in the case of the former method, since water and low boiling materials as byproducts are contained in a large amount in the diol component distilled out of the polycondensation reactors, by using the diol component without the distillation, there are problems such as an effect to the physical properties of the obtained polyester, an inhibition to the ester interchange reaction and/or polycondensation reaction by the effect of impurities, or developing a difficulty in performing a stable operation. Therefore, the method of reusing the diol component through a distillation process is preferable to the method of recovering the diol component directly without the distillation.

On the other hand, in the later process, since the low boiling substances can be removed by the distillation operation, the above problems in the former process can be solved. Here, a distillation column becomes necessary in the later process separately, but since the difference in boiling points of the produced low boiling substances and the diol component is large, no big distillation facility is necessary and for example it is desirable to use a distillation column attached to the esterification reactor or the ester exchange reactor simultaneously for the distillation of the diol component.

Such a method for producing the polyesters and a device therefor, are effective in view of not requiring the installation of a new distillation device as an additional facility, and capable of reducing an operational cost and simplifying the facilities. For example, as such a method, in JP-A 60-163918 (hereinafter, JPA means "Japanese Unexamined Patent Publication"), a method for condensing a gas consisting mainly of ethylene glycol generated from a polycondensation reactor by a wet type condenser, supplying the condensed liquid to a distillation column installed at an esterification reactor to remove low boiling point impurities and then returning the liquid to a slurry mixing tank in a continuous production method of a polyester, was disclosed. And also in JP-1854847 (hereinafter JP means "Japanese Patent"), a polymerization device in which the side of an inlet port of a sealing liquid for a liquid sealing type vacuum pump in the vacuum pump installed for making an initial polymerization vessel as a vacuum, is joined to a piping for an ethylene glycol circulation liquid used as a coolant for each of the condensers of polymerization vessels in the later stage, and another polymerization device in which the ethylene glycol is recovered by joining the side of an outlet port of the liquid sealing type vacuum pump with a distillation column attached to an esterification reactor or an ester interchange reactor, with a piping, are disclosed.

However, in the production of the polyesters, the diol component distilled out of the polycondensation reaction stage contains impurities such as monomers and/or oligomers (hereinafter "the monomers and/or oligomers" are briefly called as "an adhering material"), etc., and in case that the adhering material is mingled in the vacuum system in the polycondensation reactor in accompanying with the diol component generated in the polycondensation stage, troubles are generated since they solidify at a low temperature. And if the diol component distilled out of the polycondensation reactor and recovered by a condenser is supplied to the distillation column as it is, the adhering material sticks and grows in the distillation column to reduce a separating efficiency in the distillation column, finally induce a trouble caused by a blocking and it becomes impossible to perform a stable distillation operation. Further, a similar blocking phenomenon is induced in the piping for supplying the diol component to the distillation column.

As a counter measure to solve the above problems, a method for removing the adhering material in advance by installing a cold trap can be cited, and by this method the adhering material can be discharged to the outside of the system. However, the amount of the adhering material discharged from the system increases in accordance with reinforcing a degree of a vacuum, a reaction temperature and an agitation of the reactants to increase the polymerization rate. The above increased amount is a serious problem in the initial polycondensation stage.

Thus, in JP-763609, a cooling collection device for the distilled out material equipped with an interfering plate was proposed. Also, in JP-998614, a method for keeping a valve for controlling the degree of a vacuum or the valve and its vicinity at $\leq 120°$ C. and discharging the escaping martial by fluidizing with a hot water, a hot glycol, a steam, a glycol vapor or their mixture, was proposed. And further, in JP-A 49-126793, a polycondensation device having a jacket between the polycondensation reactor and the vacuum device and equipped with a foreign material removing device equipped with a baffle and a spraying nozzle for a washing at the inside thereof, was proposed. And in JP-1092979, a method for bringing the distillate into contact with a collecting liquid consisting of diethylene glycol and/or triethylene glycol between the polycondensation reactor and the vacuum generating device, was proposed.

Also, in the case of installing a filter in the cold trap aiming at the removal of the adhering material, since an increase in pressure loss and a blocking are induced by getting a clogging of the filter, it is necessary to take the adhering material out of the system continuously. However, the adhering material taken out of the system becomes a great loss unless it is subjected to be reused, but since the adhering material collected by the cold trap sticks firmly to the filter, etc., it is difficult to recover the material simply and at a low cost, and to furnish for the reuse.

In consideration of the above issues, the object of this invention is to eliminate troubles accompanying the blocking of the distillation column or the pipings caused by the adhering material and to enable the stable distillation operation in the continuous production of the polyesters by melt-polymerizing a raw material consisting of an acid component consisting of dicarboxylic acids composed of mainly an aromatic dicarboxylic acid and containing an alicyclic dicarboxylic acid or an aliphatic dicarboxylic acid, or the acid component consisting of their ester-forming derivatives and a diol component. And another object of this invention is to be able to recover the diol component without using a large-scaled distillation device, and to attain the reduction of operational expenses and the simplification of the facilities, and further to provide the method for the continuous production of the polyesters capable of reusing the separated/recovered adhering material as necessary.

DISCLOSURE OF THE INVENTION

This invention is a method for continuously producing a polyester by continuously melt-polymerizing a raw material consisting of a dicarboxylic acid component consisting of dicarboxylic acids composed of mainly an aromatic dicarboxylic acid and containing an alicyclic dicarboxylic acid or an aliphatic dicarboxylic acid, or their ester-forming derivatives with a diol component, characterized in that said diol component as a distillate in the polycondensation reaction, including an adhering material, is condensed, said adhering material is separated centrifugally, and then the residual diol component, after distillation, is supplied to an esterification reaction or an ester interchange reaction.

The most important characteristic of this invention is to condense the diol component as the distillate containing the adhering material in the polycondensation reaction and centrifugally separate the adhering material in the continuous production of the polyester by continuously melt-polymerizing the above acid component with the diol component by providing such a continuous production method of the polyester. Thus, it is possible to eliminate the adhering material bringing a blocking in the distillation column or the piping effectively and to enable the stable distillation operation. And also, since the residual diol component is distilled after separating the adhering material centrifugally and supplied to the esterification reaction or the ester interchange reaction, the diol component is recovered without using a large-scaled distillation device. And further, since the separated adhering material not sticking to a filter, etc., is obtained without using a cold trap which is difficult to be reused due to the sticking of the adhering material, the adhering material can be recovered and reused simply and at a low cost, and it is possible to attain the reduction of operational expenses and the simplification of the facilities.

THE BEST FORM FOR EXECUTING THE INVENTION

Figure 1:
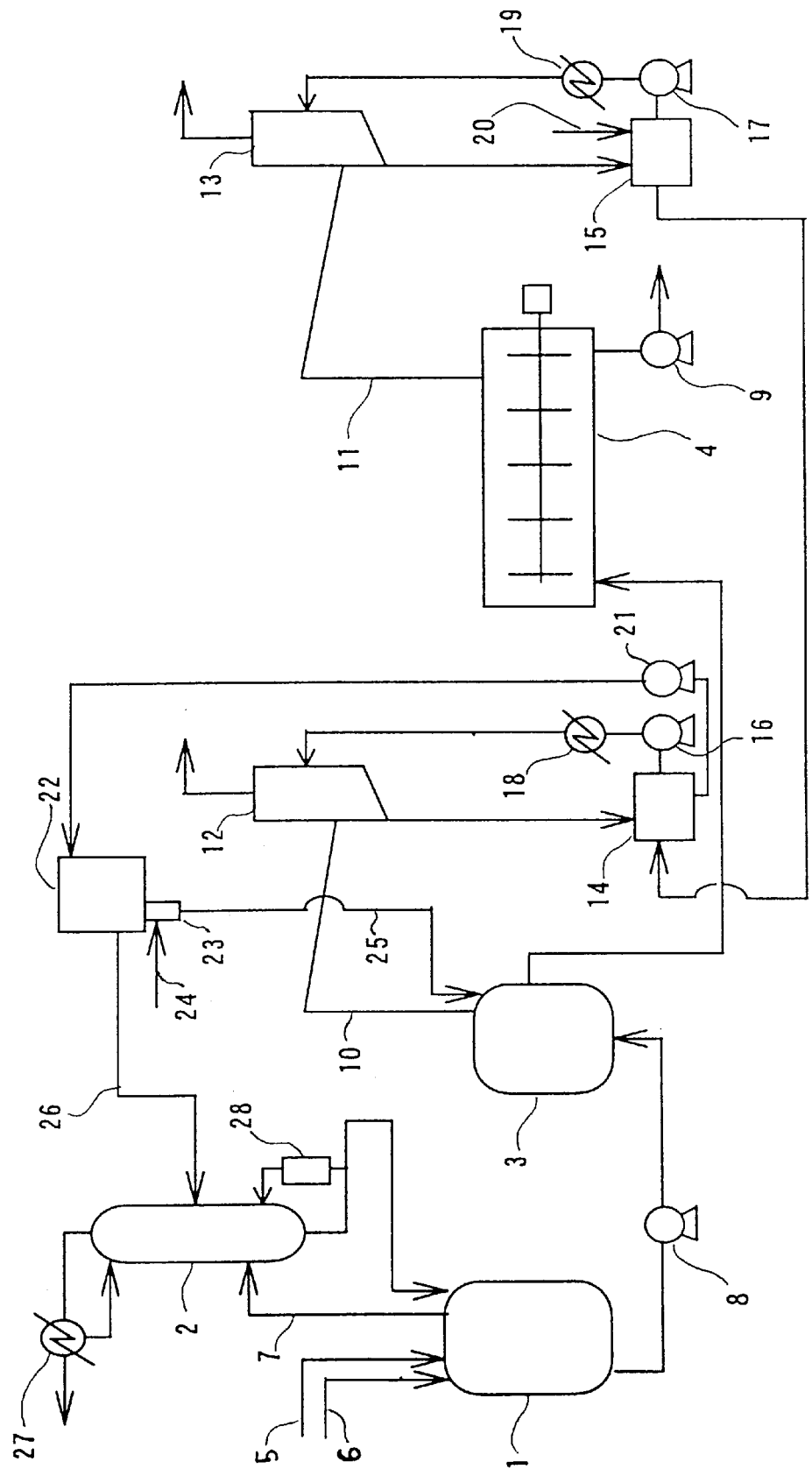
FIG. 1 is a simplified process flow chart for schematically explaining the method of a continuous polymerization of the polyester to execute the present invention.

The form for executing the present invention is explained as follows.

As the "polyester" produced by the present invention, it is obtained by a reaction of dicarboxylic acids and/or their ester-forming derivatives with diols. As the dicarboxylic acids composed mainly of the aromatic dicarboxylic acid component and their ester-forming derivative, constituting the polyester for example, terephthalic acid, isophthalic acid, phthalic acid, 1,4-naphthalene dicarboxylic acid, 1,5-naphthalene dicarboxylic acid, 2,6-naphthalene dicarboxylic acid, 2,7-naphthalene dicarboxylic acid and/or their lower alkyl esters (the carbon numbers of the alkyl group are usually 1–4), etc., are cited. Further, as the alicyclic dicarboxylic acid components or their ester-forming derivatives, for example cyclohexane dicarboxylic acid, etc., are cited, and as the aliphatic dicarboxylic acid components or their ester-forming derivatives, adipic acid, sebasic acid, suberic acid, etc., are cited. As these dicarboxylic acid, preferably terephthalic acid, 2,6-naphthalene dicarboxylic acid, isophthalic acid and/or their dimethylester compounds are cited. Further, these aromatic dicarboxylic acid components, alicyclic dicarboxylic acid components and aliphatic dicarboxylic acid components can be used singly or two or more kinds simultaneously.

Next, as the diol components, ethylene glycol, neopentyl glycol, 1,2-propane diol, 1,3-propane diol, 1,3-butane diol, 1,4-butane diol, 1,5-pentane diol, 1,6-hexane diol, 1,2-cyclohexane diol, 1,2-cyclohexane dimethanol, 1,3-cyclohexane dimethanol, 1,4-cyclohexane dimethanol, diethylene glycol, triethylene glycol, a polyalkylene glycol, propylene glycol, etc., are cited, and preferably among them ethylene glycol, 1,4-butane diol and diethylene glycol are used as main components. Here, "main" means 50 mol % or more, preferably 80 mol % or more based on the total diol component. Further, these diol components can be used singly or two or more kinds simultaneously.

As the polyester consisting of these dicarboxylic acids and diols, preferably polyethylene terephthalate, polybutylene terephthalate, polyethylene naphthalate, polybutylene naphthalate and their copolyesters can be cited.

Also, with the above polyester, a compound of a multiple functional compound having three or more functions such as trimelitic acid, pyromelitic acid, glycerol, etc., or a mono functional compound such as benzoic acid, phenyl isocyanate, etc., can be copolymerized.

The production of the polyester in the present invention can be performed either in the presence or absence of a catalyst, and in the case of using the catalyst, a commonly known catalyst can be used. For example, an antimony compound, a manganese compound, a titanium compound, a tin compound, a zinc compound, a magnesium compound, a germanium compound, etc., are used. The position of supplying the catalyst or the method for supplying the catalyst are not specifically limited. And, as necessary, one or more kinds of commonly used thermoplastic resins, additives, inorganic fillers, organic fillers, etc., can be added as it is or with the diol component, or can be mulled into the polyester at the discharging side of the final polycondensation reactor directly by using a molding device, an extruder, a mixer, etc. Also, it is of course possible that after the pelletization of the polyester, these materials can be mulled into the polyester by re-melting the pellets. As the other thermoplastic resins, a polyester-based resin, a polyamide-based resin, a polystyrene-based resin, a polycarbonate, a polyacetal, etc., are cited. Also, as the additives, commonly known materials such as an antioxidant, an antistatic agent, a flame retarding agent such as a brominated polycarbonate, a brominated epoxy compound, etc., a flame retarding assistant such as antimony trioxide, antimony pentoxide, etc., a plasticizer, a lubricant, a releasing agent, a coloring agent, a crystal nucleating agent, etc., are cited. As the inorganic fillers, a glass fiber, a talc, a mica, glass flakes, a carbon fiber, a silica, an alumina fiber, a milled glass fiber, a clay, a carbon black, a kaolin, metal oxides such as a titanium oxide, an iron oxide, an antimony oxide, an alumina, etc., alkali metal compounds such as a compound of sodium or potassium, etc., are cited. As the organic filler, an aromatic polyester fiber, a liquid crystalline polyester fiber, etc., are cited.

Hereinafter, the form of the execution of the present invention is explained in detail in reference with the FIGURE as follows. The FIG. 1 is shown as an example of the flow chart of the continuous production of the polyester for executing the present invention.

In the chart, 1 is an esterification reactor or an ester interchange reactor, 2 is a distillation column attached to the esterification reactor or ester interchange reactor, and connected to the esterification reactor or ester interchange reactor 1 with a piping. Also, 3 shows an initial polycondensation reactor, 4 shows a final polycondensation reactor, and 5 and 6 show raw material supplying tubes. Further, 7, 10 and 11 show exhaust tubes, 8 and 9 show gear pumps, 12 and 13 show wet type condensers, 14 and 15 show circulation vessels for a circulating coolant, 16 and 17 show circulating pumps, 18, 19 and 27 show cooling devices, 20, 24 and 26 show supplying pipings, 22 shows a centrifugal separating device, 21 shows a supplying pump for the centrifugal separating device, 23 shows a discharging port for the adhering material, 25 shows a returning piping installed as necessary and 28 shows a reboiler. Further, the ester exchange reactor 1, and each of the reactors 3 and 4 have heating means for heating the reactors to desired temperatures (not shown in the chart).

In the present executing example constituted as above, the case of producing polybutylene terephthalate by the ester interchange method is explained in detail. Dimethyl terephthalate as a raw material is supplied from the supplying tube 5, and 1,4-butanediol and titanium(IV) tetrabutoxide as a catalyst are supplied from the supplying tube 6. The molar ratio of 1,4-butane diol and dimethyl terephthalate is preferably 1.1–2.0 range, especially 1.3–1.8.

Also, the temperature in the ester interchange reactor is set at 160–200° C., and the raw materials supplied from the supplying tubes 5 and 6 are subjected to the ester interchange reaction under an atmospheric pressure. During the reaction, generated vapor as a secondary product consisting mainly of distilled methanol is led to the distillation column 2 through the exhaust tube 7. At that time, the reacted material is an oligomer having 2–6 of the degree of polymerization with the amount of distilled methanol of 80–95% based on a theoretical amount, and transported to the initial polycondensation reactor 3 through a gear pump 8. The polycondensation reaction is performed in the polycondensation reactor 3, then the content of the reactor is transported to the polycondensation reactor 4 and the final polycondensation reaction is performed in the polycondensation reactor 4.

Here, the numbers and forms of the ester interchange reactors and the polycondensation reactors are not particularly limited, the most suitable ones can be used optionally as necessary. For example, in order to improve a reaction rate, an inert gas such as $N_2$ or Ar is blown into the reactor. In that case, an effect of separating the accompanying adhering material with the inert gas is also effected by using the method of the present invention.

Also, the conditions of the temperature and the pressure in each of the reactors 3 and 4 are controlled at a temperature of 230–255° C. and under a degree of vacuum of 10–100 Torr in the initial polycondensation reactor 3, and at a temperature of 230–255° C. and under a degree of vacuum of 1–5 Torr in the final polycondensation reactor 4. Thus, finally obtained polybutylene terephthalate is taken out by the gear pump 9. And the polymer is pelletized by a granulating process, etc.

Further, each vapor consisting mainly of 1,4-butane diol as a main component and generated from the initial polycondensation reactor 3 and the final polycondensation reactor 4 is condensed in wet type condensers 12 and 13 by using the 1,4-butane diol as a circulation liquid through exhaust tubes 10 and 11, and forwarded to the 1,4-butane diol circulation vessels 14 and 15 respectively. Further, the generated vapor consisting mainly of 1,4-butane diol also contains impurities such as methanol, tetrahydrofuran, water, the adhering material, etc. Also, the 1,4-butane diols as the circulation liquid of the wet type condensers 12 and 13, are each circulated by the pumps 16 and 17, and in each of the circulation systems, cooling devices 18 and 19 are provided respectively.

Also, fresh 1,4-butane diol is supplied to the 1,4-butane diol circulating vessel 15 through the supplying pipe 20 as necessary. The 1,4-butane diol circulation vessels 14 and 15 are connected each other by a piping, and the 1,4-butane diol containing the impurities is transported from the circulation vessel 15 to the circulation vessel 14 by an overflow. At that time, a part of the adhering material can be captured in the circulating vessels, but it is difficult to collect it sufficiently. However, in the case of not sufficiently collect the adhering material, the adhering material contained in the diol component consisting mainly of 1,4-butane diol generated in the polycondensation stage, induces the serious problems of blocking phenomena in the supplying tubes 26 and the distillation column 2 as previously described.

In order to solve the above problems, as a very important characteristic in the present invention, the 1,4-butane diol containing impurities is supplied into the centrifugal separating device 22 from the circulation vessel 14 by the pump 21, and the adhering material is sufficiently removed.

Further, the type of the centrifugal separating device 22 is not specifically limited, but a decanter type centrifugal settling device, a separating plate type centrifugal settling device, etc., are suitable, and suitable centrifugal conditions are selected in a range so far as a preferable collection efficiency can be obtained. Also, as to the installing position of the centrifugal separating device 22, it may be installed in a previous stage for supplying to the distillation column 2, or at the discharging side of the circulating pumps 17 and 21 for eliminating the troubles of blocking of the spray nozzle of the wet type condenser with the adhering material and yielding an advantage of performing a stable operation. Further, during the centrifugal separating operation, in the case of having a fear of involving air bubbles into the 1,4-butane diol from which the adhering material is removed, it is possible to fill the inside of the centrifugal separating device 22 with an inert gas such as $N_2$ or Ar, or to keep the space under a reduced pressure.

Further, a discharging port 23 for the adhering material is provided in the centrifugal separating device 22, and a fresh 1,4-butane diol is supplied from the supplying piping 24 and discharged from the centrifugal separating device 22 accompanying the separated adhering material. At this stage, the adhering material can be returned to the polycondensation reactor through a returning piping 25 together with 1,4-butane diol, and it is expected to have a wide improvement in the yield of the polymer. Further, it is preferable to heat the adhering material and/or 1,4-butane diol up to a prescribed temperature in advance, before returning them to the polycondensation reactor.

As described above, the residual 1,4-butane diol from which the adhering material is removed, is supplied to the distillation column 2 attached to the ester interchange reactor 1 through the supplying piping 26 and distilled. Further, the distillation column 2 simultaneously distills the vapor as the secondary product consisting of methanol as a main component and introduced from the ester interchange reactor 1 and the 1,4-butane diol from which the adhering material is removed. The temperature at the top part of the distillation column 2 is controlled by a refluxing amount by the cooling device 27, and the temperature at the bottom is controlled by the reboiler 28. And from the top part a vapor consisting of methanol as a main component, and containing tetrahydrofuran and water is distilled and condensed by the cooling device 27. And from the bottom part thereof, a diol component consisting of 1,4-butane diol as a main component is recovered and reused at least as a part of the diol component as the starting raw material.

By using the method in the present invention, it is possible to prevent the system from troubles such as a blocking of the distillation column 2 caused by the adhering material contained in the diol component consisting of 1,4-butane diol as the main component and generated at the polycondensation reaction.

Next, examples of the present invention are explained concretely by using the process flow chart of the production of the polyester by the continuous polymerization shown in the FIG. 1.

EXAMPLE 1

A polybutylene terephthalate oligomer at 90% ester interchange rate was obtained by continuously supplying 103 kg/hr of dimethyl terephthalate, 76 kg/hr of 1,4-butane diol and 0.09 kg/hr of titanium(IV) tetrabutoxide into an ester interchange reactor and performing the ester interchange reaction at a temperature of 165–190° C. under an atmospheric pressure.

Next, the obtained oligomer was continuously supplied into an initial polycondensation reactor 3 through a pump 8 for performing a polycondensation reaction at a temperature of 240° C. and under a degree of vacuum of 35 Torr. Then, the obtained low molecular weight polymer was continuously supplied into a final polycondensation reactor 4 for performing the polycondensation reaction at a temperature of 240–248° C. and under a degree of vacuum of 1.5 Torr. And then, the obtained polybutylene terephthalate polymer was taken out by a gear pump 9 and pelletized by a granulating process.

Further, each generated vapor as a secondary product consisting of 1,4-butane diol as the main component from the initial polycondensation reactor 3 and the final polycondensation reactor 4 was accompanied by an adhering material, but condensed mostly in wet type condensers 12 and 13 using the 1,4-butane diol as a circulation liquid through exhaust tubes 10 and 11, and transported into 1,4-butane diol circulation vessels 14 and 15 respectively.

In this case, a fresh 1,4-butane diol was supplied to the 1,4-butane diol circulation vessel 15 from a supplying tube 20. Since the 1,4-butane diol circulation vessels 14 and 15 are connected by a piping, the 1,4-butane diol containing the adhering material was transported from the circulation vessel 15 to the circulation vessel 14 by an overflow.

Further, the 1,4-butane diol containing 4 wt. % concentration of the adhering material was supplied continuously into a decanter type centrifugal separating device 22 at a rate of 45 kg/hr from the circulation vessel 14 by a pump 21, and 99.5 wt. % of the adhering material contained in the 1,4-butane diol is separated at 800 G centrifugal force.

Further, in the centrifugal separating device 22, a discharging port 23 for the adhering material was provided and the adhering material was discharged to the out of the system. Also, the residual 1,4-butane diol from which the adhering material has been separated, was supplied to a distillation column 2 attached to the ester interchange reactor 1 through the supplying piping 26. The temperature at the top part of the distillation column 2 was 101° C., and the bottom temperature thereof was controlled at 190° C. by a reboiler 28. From the top part, a vapor consisting of methanol as a main component and containing tetrahydrofuran and water was distilled and condensed for liquefying by a cooling device 27 and discharged to the outside of the system. Also, from the bottom part, 1,4-butane diol containing a small amount of water was recovered and reused as a part of the starting raw material.

By the example described above, a trouble based on the blocking caused by the sticking of the adhering material to the distillation column and pipings did not happen entirely and it was possible to perform the operation stably.

EXAMPLE 2

Fresh 1,4-butane diol was supplied at a rate of 10 kg/hr from a supplying tube 24, and separated adhering material is discharged together with the fresh 1,4-butane diol from the discharging port 23 for the adhering material from the centrifugal separating device 22. And the production of the polybutylene terephthalate was carried out under similar conditions with those of the example 1 except for returning the above adhering material to the initial polycondensation reactor 3 through a returning piping 25 having a heating means. As a result, it was possible to operate stably without developing a trouble based on the blocking caused by the sticking of the adhering material to the distillation column and the pipings. Also, since the adhering material was reused without being discarded, it was possible to exhibit a large effect for improving the yield of the polymer by preventing a loss.

COMPARATIVE EXAMPLE 1

For the sake of a comparison, the production of the polybutylene phthalate was performed under the similar conditions with those of the example 1 except for not performing the centrifugal separation of the adhering material, then the adhering material such as a monomer, an oligomer, etc., piles up in the distillation column to induce the elevation of an inner pressure in the distillation column and the stable operation could not be performed.

EXAMPLE 3

A polyethylene terephthalate oligomer at 95% esterification rate was obtained by continuously supplying 80 kg/hr of terephthalic acid and 60 kg/hr of ethylene glycol into an esterification reactor 1 after preparing them as a slurry and performing the esterification reaction at a temperature of 285° C. under an atmospheric pressure. Next, the obtained oligomer was continuously supplied into the initial polycondensation reactor 3 through the pump 8 after adding antimony trioxide for performing a polycondensation reaction at a temperature of 285° C. and under a degree of vacuum of 20 Torr to obtain a low molecular weight polyethylene terephthalate. Then, the obtained low molecular weight polymer was continuously supplied into the final polycondensation reactor 4 for performing the polycondensation reaction at a temperature of 285–293° C. and under a degree of vacuum of 1.5 Torr. And then, the obtained polyethylene terephthalate polymer was directly transported by the gear pump 9 to a spinning process and spun.

Further, each generated vapor as a secondary product consisting of ethylene glycol as a main component from the initial polycondensation reactor 3 and the final polycondensation reactor 4 accompanied the adhering material, but condensed mostly in the wet type condenser 12 and 13 using ethylene glycol as the circulation liquid through the exhaust tubes 10 and 11 and transported into the ethylene glycol circulation vessels 14 and 15 respectively. In this case, a fresh ethylene glycol was supplied to the circulation vessel 15 from the supplying tube 20. Since the ethylene glycol circulation vessels 14 and 15 were connected by the piping, the ethylene glycol containing the adhering material was transported from the circulation vessel 15 to the circulation vessel 14 by the overflow. Further, the ethylene glycol containing 2 wt. % concentration of the adhering material was supplied into the separating plate type centrifugal separating device 22 at a rate of 25 kg/hr from the circulation vessel 14 by the pump 21, and 99.8 wt. % of the adhering material contained in the ethylene glycol was separated at 1000 G centrifugal force. Further, in the centrifugal separating device 22, the discharging port 23 for the adhering material was provided and the adhering material was discharged to the out of the system. Also, the residual ethylene glycol from which the adhering material has been separated, was supplied to the distillation column 2 attached to the esterification reactor 1 through the supplying piping 26. The temperature at the top part of the distillation column 2 was 103° C., and the bottom temperature was controlled at 197° C. by the reboiler 28. From the top part, a vapor consisting of water as a main component was distilled and condensed for liquefying by the cooling device 27, and discharged to the outside of the system. Also, from the bottom part, ethylene glycol containing a small amount of water was recovered and reused as a part of the starting raw material.

By the example described above, a trouble based on the blocking caused by the sticking of the adhering material to the distillation column and pipings did not happen entirely and it was possible to perform the operation stably.

EXAMPLE 4

Fresh ethylene glycol was supplied at a rate of 10 kg/hr from the supplying tube 24, and separated adhering material is discharged together with the fresh ethylene glycol from the discharging port 23 for the adhering material from the centrifugal separating device 22. And the production of the polyethytlene terephthalate was carried out under similar conditions with those of the example 3 except for returning the above adhering material to the initial polycondensation reactor 3 through a returning piping 25 having a heating means. As a result, it was possible to operate the distillation stably without developing a trouble based on the blocking caused by the sticking of the adhering material to the distillation column and the pipings. Also, since the adhering material was reused without being discarded, it was possible to exhibit a large effect for improving the yield of the polymer by preventing a loss.

COMPARATIVE EXAMPLE 2

For the sake of a comparison, the production of the polyethylene terephthalate was performed under the similar conditions with those of the example 3 except for not performing the centrifugal separation of the adhering material, then the adhering material such as a monomer, an oligomer, etc., piles up in the distillation column to induce the elevation of an inner pressure in the distillation column and the stable operation could not be performed.

EXAMPLE 5

A polyethylene naphthalate oligomer at 99.5% ester exchange rate was obtained by continuously supplying 100 kg/hr of 2,6-naphthalene dicarboxylic acid and 51 kg/hr of ethylene glycol into the ester interchange reactor 1 and performing the ester interchange reaction at a temperature of 160–250° C. under an atmospheric pressure by using 0.03 kg/hr of manganese acetate tetrahydrate salt as an ester interchange catalyst, and then adding trimethyl phosphate. Next, the obtained oligomer was continuously supplied into the initial polycondensation reactor 3 through the pump 8 after adding antimony trioxide for performing a polycondensation reaction at a temperature of 280° C. and under a degree of vacuum of 50 Torr to obtain a low molecular weight polyethylene naphthalate. Then, the obtained low molecular weight polymer was continuously supplied into the final polycondensation reactor 4 for performing the polycondensation reaction at a temperature of 280–290° C. and under a degree of vacuum of 1.5 Torr. And then, the obtained polyethylene naphthalate polymer was taken out by the gear pump 9, pelletized in the granulating process, and then highly polymerized by a solid phase polymerization process. Further, each generated vapor as a secondary product consisting of ethylene glycol as a main component from the initial polycondensation reactor 3 and the final polycondensation reactor 4 accompanied the adhering material, but condensed mostly in the wet type condenser 12 and 13 using ethylene glycol as the circulation liquid through exhaust tubes 10 and 11 and transported into the ethylene glycol circulation vessels 14 and 15 respectively. In this case, a fresh ethylene glycol was supplied to the circulation vessel 15 from the supplying tube 20. Since the ethylene glycol circulation vessels 14 and 15 were connected by the piping, the ethylene glycol containing the adhering material was transported from the circulation vessel 15 to the circulation vessel 14 by the overflow. Further, the ethylene glycol containing 1.5 wt. % concentration of the adhering material in the ethylene glycol was supplied into the decanter type centrifugal separating device 22 at a rate of 50 kg/hr from the circulation vessel 14 by the pump 21, and 99.5 wt. % of the adhering material contained in the ethylene glycol was separated at 700 G centrifugal force. Further, in the centrifugal separating device 22, the discharging port 23 for the adhering material was provided and the adhering material was discharged to the out of the system. Also, the residual ethylene glycol from which the adhering material has been separated, was supplied to the distillation column 2 attached to the ester interchange reactor 1 through the supplying piping 26. The temperature at the top part of the distillation column 2 was 101° C., and the bottom temperature thereof was controlled at 197° C. by the reboiler 28. From the top part, a vapor consisting of water as a main component was distilled and condensed for liquefying by the cooling device 27, and discharged to the outside of the system. Also, from the bottom part, ethylene glycol containing a small amount of water was recovered and reused as a part of the starting raw material.

By the example described above, a trouble based on the blocking caused by the sticking of the adhering material to the distillation column and pipings did not happen entirely and it was possible to perform the operation stably.

EXAMPLE 6

The residual ethylene glycol from which the adhering material has been separated, was supplied to a continuous distillation column (not shown in the chart) installed separately instead of the distillation column 2 attached to the ester interchange reactor 1. The temperature at the top part of the distillation column was 101° C., and the bottom temperature thereof was controlled at 197° C. by the reboiler. From the top part, a vapor consisting of water as a main component was distilled and condensed for liquefying by the cooling device, and discharged to the outside of the system. Also, from the bottom part, ethylene glycol containing a small amount of water was recovered and reused as a part of the starting raw material. The production of the polyethylene naphthalate was conducted under the similar conditions to those of in the example 5, then a trouble based on the blocking caused by the sticking of the adhering material to the distillation column and pipings did not happen entirely and it was possible to perform the operation stably.

EXAMPLE 7

Fresh ethylene glycol was supplied at a rate of 10 kg/hr from the supplying tube 24, and separated adhering material is discharged together with the fresh ethylene glycol from the discharging port 23 for the adhering material from the centrifugal separating device 22. And the production of the polyethylene naphthalate was carried out under the similar conditions with those of the example 5 except for returning the above adhering material to the initial polycondensation reactor 3 through a returning piping 25 having a heating means, then, it was possible to operate stably without developing a trouble based on the blocking caused by the sticking of the adhering material to the distillation column and the pipings. Also, since the adhering material was reused without being discarded, it was possible to exhibit a large effect for improving the yield of the polymer by preventing a loss.

COMPARATIVE EXAMPLE 3

For the sake of a comparison, the production of the polyethylene naphthalate was performed under the similar conditions with those of the example 5 except for not performing the centrifugal separation of the adhering material, then the adhering material such as a monomer, an oligomer, etc., piles up in the distillation column to induce the elevation of an inner pressure in the distillation column and the stable operation could not be performed.

Effects of the Invention

This invention enables a stable production of a polyester by supplying a diol component distilled out by a polycondensation reaction to a centrifugal separating device in a state of containing an adhering material and separating the adhering material in the previous stage of supplying the diol component to a distillation column to eliminate the blocking of the distillation column caused by the adhering material. Thus, the diol component from which the adhering material has been removed, can be recovered by not performing a complex distillation operation, and also the removed adhering material can be recovered easily and at a low cost, and reused Therefore, this invention has an extremely large effect in attaining the reductions of operating expenses and raw material costs and the simplification of facilities in the method for producing the polyester by the continuous melt polymerization.

We claim:

1. A method for continuously producing a polyester by continuously melt-polymerizing a raw material consisting of a dicarboxylic acid component composed of mainly an aromatic dicarboxylic acid and containing an alicyclic dicarboxylic acid or an aliphatic dicarboxylic acid, or their ester-forming derivatives with a diol component, characterized in that said diol component as a distillate in the polycondensation reaction, including an adhering material, is condensed, said adhering material is separated centrifugally, and then the residual diol component, after distillation, is supplied to an esterification reaction or an ester interchange reaction.

2. A method for continuously producing the polyester described in the claim 1, wherein the diol component is any of the ethylene glycol, 1,4-butane diol or diethylene glycol.

3. A method for continuously producing the polyester described in the claim 1, wherein the centrifugal separating device is either a decanter type centrifugal settling machine or a separating plate type centrifugal settling machine.

4. A method for continuously producing the polyester described in claim 1, wherein the residual diol component is supplied to a distillation column attached to an esterification reactor or an ester interchange reactor for distillation thereof.

5. A method for continuously producing the polyester described in claim 1, wherein the separated and recovered adhering material by the centrifugal separating device is supplied to the polycondensation reaction.

* * * * *